(12) United States Patent
Beattie, Jr. et al.

(10) Patent No.: US 8,345,560 B2
(45) Date of Patent: Jan. 1, 2013

(54) METHODS AND APPARATUS TO PRE-QUALIFY USER COMMUNITIES FOR COMMUNICATION SERVICES

(75) Inventors: James Gordon Beattie, Jr., Bergenfield, NJ (US); Stephen J. Griesmer, Westfield, NJ (US); Debebe Assefa Asefa, Eatontown, NJ (US); Stephen Francis Triano, Kearny, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 9 days.

(21) Appl. No.: 12/334,169

(22) Filed: Dec. 12, 2008

(65) Prior Publication Data

US 2010/0149999 A1   Jun. 17, 2010

(51) Int. Cl.
   *H04L 12/26* (2006.01)
(52) U.S. Cl. .......................................... 370/249
(58) Field of Classification Search .................... None
   See application file for complete search history.

(56) References Cited

U.S. PATENT DOCUMENTS

| | | | |
|---|---|---|---|
| 5,343,461 A * | 8/1994 | Barton et al. ................. | 370/249 |
| 6,151,691 A * | 11/2000 | Pesetski et al. ............... | 714/713 |
| 6,574,308 B1 | 6/2003 | Macdonald et al. | |
| 6,584,148 B1 | 6/2003 | Zitting et al. | |
| 6,599,038 B1 * | 7/2003 | Henderson ..................... | 398/17 |
| 6,819,746 B1 | 11/2004 | Schneider et al. | |
| 6,820,038 B1 | 11/2004 | Wetzer et al. | |
| 6,909,781 B1 | 6/2005 | Itri | |
| 7,003,078 B2 | 2/2006 | Starr et al. | |
| 7,042,983 B2 | 5/2006 | Bauer et al. | |
| 7,123,584 B2 | 10/2006 | Blackburn | |
| 7,126,914 B2 | 10/2006 | Blackburn | |
| 7,272,209 B2 | 9/2007 | Jiang et al. | |
| 7,349,526 B2 | 3/2008 | Urban | |
| 7,362,713 B2 | 4/2008 | Jiang et al. | |
| 7,388,906 B2 | 6/2008 | Hart et al. | |
| 2005/0264383 A1 * | 12/2005 | Zhang ............................. | 335/18 |
| 2007/0171899 A1 * | 7/2007 | Schroeder et al. ............ | 370/356 |
| 2007/0263774 A1 | 11/2007 | Wollmershauser et al. | |

OTHER PUBLICATIONS

"Sticking Close to Home—Technology Information," Ken Alton, http://findarticles.com/p/articles/mi_m0TLC/is_8_35/ai_77712360/print?tag=artBody;col. 1, Aug. 2001, 3 pages.

"Functional Criteria for the DS1 Interface Connector," BellSouth Telecommunications, TR 73569, Issue A, Jun. 1993, 73 pages.

"Network interface unit," Author Unknown, http://www.hill2dot0.com/wiki/index.php?title=Network_interface_unit, Oct. 21, 2008, 2 pages.

* cited by examiner

*Primary Examiner* — Jianye Wu
(74) *Attorney, Agent, or Firm* — Hanley, Flight & Zimmerman, LLC (57) ABSTRACT

Example methods and apparatus to pre-qualify user communities for communication services are disclosed. An example method comprises configuring a first remote network demarcation associated with a first loop to a loop-back state, interrogating the first loop to determine a first parameter representative of the first loop, configuring a second remote network demarcation associated with a second loop to the loop-back state, interrogating the second loop to determine a second parameter representative of the second loop, and compiling a report based on the first and second parameters, the report containing a value that represents a degree to which a communication service can be provided to a user community associated with the first and second loops.

28 Claims, 7 Drawing Sheets

METHODS AND APPARATUS TO PRE-QUALIFY USER COMMUNITIES FOR COMMUNICATION SERVICES

FIELD OF THE DISCLOSURE

This disclosure relates generally to user communities and, more particularly, to methods and apparatus to pre-qualify user communities for communication services.

BACKGROUND

Access networks and/or systems using digital subscriber line (DSL) technologies are commonly utilized to provide communication services to customer premises. DSL technologies enable service providers to utilize telephone lines to connect customers to, for example, a high data-rate broadband Internet network, a broadband service and/or broadband content. An example telephone line uses twisted-pair copper wire to provide Plain Old Telephone System (POTS) services.

A communication company and/or service provider may utilize a plurality of DSL modems implemented by a DSL access multiplexer (DSLAM) and/or a video ready access device (VRAD) at a central office (CO), a remote terminal (RT) or a serving area interface (SAI) to provide DSL communication services to a plurality of customer-premises DSL modems located at respective customer premises. In general, a DSLAM/VRAD receives broadband service content for a subscriber from, for example, a backbone server. A CO DSL modem at the DSLAM/VRAD forms from the content a downstream DSL signal to be transmitted to a customer-premises DSL modem via a telephone line that electrically couples the CO DSL modem at the SAI, RT or CO to the customer-premises DSL modem. Likewise, the CO DSL modem receives an upstream DSL signal from the customer-premises DSL modem via the corresponding subscriber's telephone line, and the DSLAM/VRAD provides the data received via the upstream DSL signal to the backbone server. One or more characteristics of the subscriber's telephone line determine what type(s) and/or speed(s) of DSL services can be supported by the subscriber's telephone line.

DETAILED DESCRIPTION

Example methods and apparatus to pre-qualify user communities for communication services are disclosed. A disclosed example method includes configuring a first remote network demarcation associated with a first loop to a loop-back state, interrogating the first loop to determine a first parameter representative of the first loop, configuring a second remote network demarcation associated with a second loop to the loop-back state, interrogating the second loop to determine a second parameter representative of the second loop, and compiling a report based on the first and second parameters, the report containing a value that represents a degree to which a communication service can be provided to a user community associated with the first and second loops.

A disclosed example system includes a first customer premises associated with a first subscriber line and having a first demarcation point, a second customer premises associated with a second subscriber line and having a second demarcation point, a first test module to interrogate the first subscriber line to determine a first parameter representative of the first subscriber line, a second test module to interrogate the second subscriber line to determine a second parameter representative of the second subscriber line, and a pre-qualification server. The pre-qualification server to configure the first network demarcation point associated with the first subscriber line to a loop-back state, configure the second network demarcation point associated with the second subscriber line to the loop-back state, and generate a report based on the first and second parameters, the report containing a value that represents a degree to which a communication service can be provided to a user community associated with the first and second subscriber lines.

Another disclosed example method includes installing evaluation software on a computer communicatively coupled to a customer-premises equipment (CPE) modem, the evaluation software to configure the CPE modem to a test state, interacting with the CPE modem while in the test state to interrogate a wire associated with the first CPE modem to determine a first parameter representative of the wire, and generating a report based on the first parameter, the report containing a value that represents a degree to which a communication service can be provided to a user community associated with the wire.

Yet another disclosed example method includes prompting a user for permission to test whether a wire associated with the user is capable to support a communication service, configuring a CPE modem associated with the user to a test state when the permission is received, wherein the CPE modem while in the test state is to test the wire for the communication service, presenting a first value representative of a result of the test to the user, and prompting the user to provide a second value representative of an interest in the communication service.

In the interest of brevity and clarity, throughout the following disclosure references will be made to an example access network 100 of FIG. 1. However, the methods and apparatus described herein to pre-qualify user communities for communication services are applicable to other types of access networks and/or communication systems constructed using other network technologies, topologies and/or protocols. Other example systems include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/ Very High Frequency (VHF) radio frequency systems, satellite or other extra-terrestrial systems, cellular distribution systems, power-line broadcast systems, fiber optic networks, passive optical network (PON) systems, and/or any combination and/or hybrid of these devices, systems and/or networks.

Figure 1:
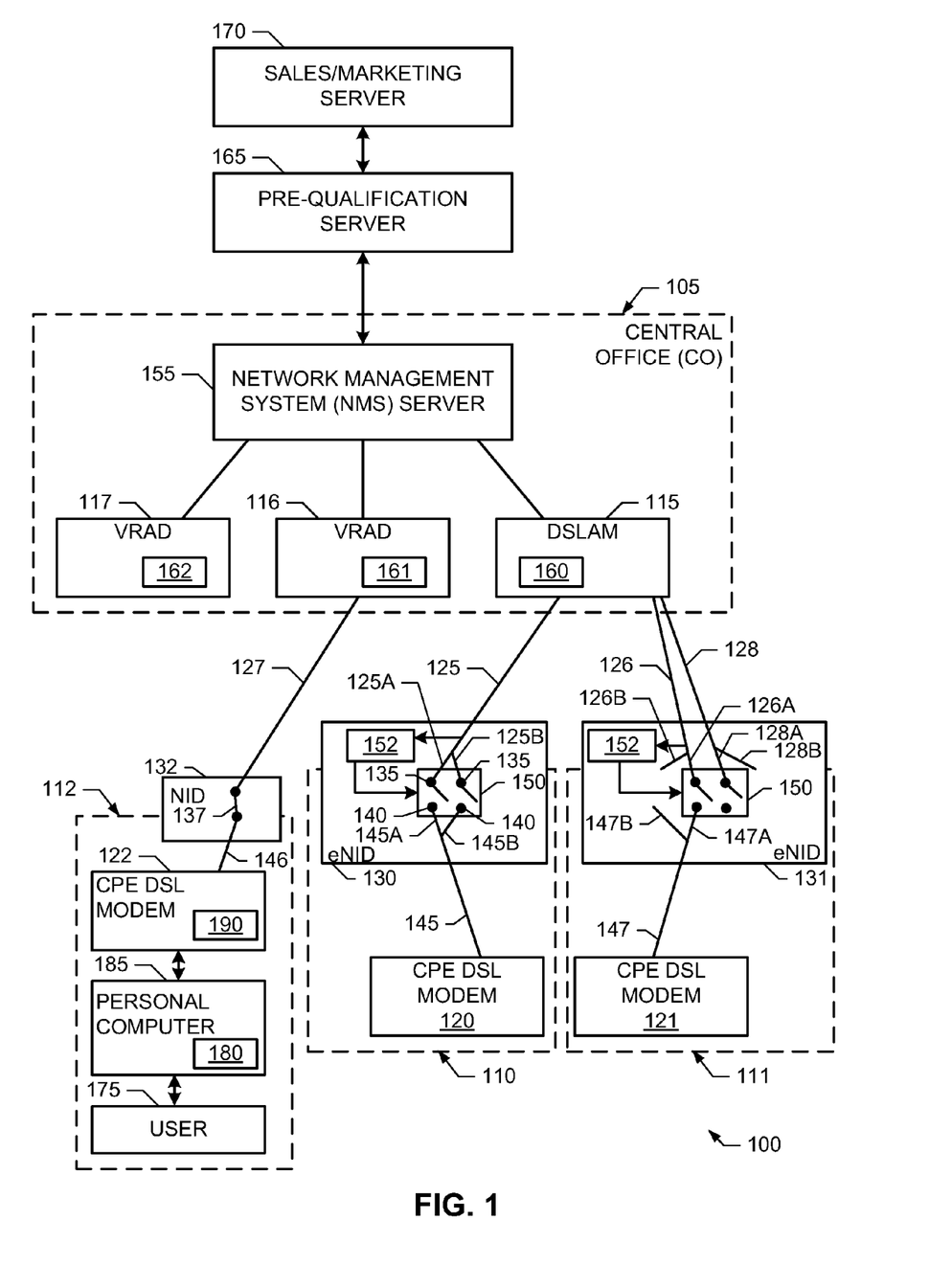
FIG. 1 is a schematic illustration of an example access network constructed in accordance with the teachings of this disclosure.

FIG. 1 illustrates the example access network 100. The example access network 100 of FIG.1 includes any number and/or type(s) of central offices (COs), one of which is designated at reference numeral 105, remote terminals (RTs) and/or serving area interfaces (SAIs). The example CO 105 of FIG. 1, and/or other COs, RTs and/or SAIs are used to provide data and/or communication services to one or more customer premises, three of which are designated at reference numerals 110, 111 and 1 12. Example data and/or communication services include, but are not limited to, telephone services, Internet services, data services, messaging services, instant messaging services, electronic mail (email) services, chat services, video services, audio services, gaming services. To provide DSL communication services to the customer premises 110-112, the example CO 105 of FIG. 1 includes any number and/or type(s) of DSL access multiplexers (DSLAMs) and/or video-ready access devices (VRADs), three of which are designated at reference numerals 115, 116 and 117, and the example customer premises 110-112 include any type(s) of CPE DSL modems 120, 121 and 122. The example DSLAMs/VRADs 115-117 of FIG. 1 include and/or implement one or more CO DSL modems (not shown) for respective ones of the customer premises 110-1 12. The example DSLAMs/VRADs 115-117, the CO DSL modems within the DSLAMs/VRADs 115-117, and/or the example CPE DSL modems 120-122 of FIG. 1 may be implemented, for example, in accordance with the International Telecommunications Union—Telecommunications Sector (ITU-T) G.993.x family of standards for very high-speed DSL (VDSL), and/or the ITU-T G.992.x family of standards for asymmetric DSL (ADSL). However, the CO DSL modems and/or the CPE DSL modems 120-122 may be implemented in accordance with any past, present and/or future standard, specification and/or recommendation.

While in the illustrated example of FIG. 1, the DSLAMs/VRADs 115-117 are implemented at the CO 105, any of the DSLAMs/VRADs 115-117 may be, additionally or alternatively, implemented at an RT, at an SAI and/or at any other location between the CO 105 and the customer premises 110-1 12. In such instances, a fiber-optic cable (not shown) may be used, for example, to communicatively couple the remotely located DSLAM/VRAD 115-117 to the CO 105.

In the illustrated example of FIG. 1, the DSLAM 115 provides DSL services to the CPE DSL modems 120-122 via respective subscriber lines 125, 126, 127 and 128. Subscriber lines are sometimes also referred to in the industry as "wires," "wire-pairs," "subscriber loops" and/or "loops." While throughout this disclosure reference is made to the example loops 125-127 of FIG. 1, a loop (e.g., any of the example loops 125-127) used to provide a DSL service to a customer-premises location (e.g., any of the locations 110-112) may include and/or be constructed from one or more segments of twisted-pair telephone wire (e.g., any combination of a feeder one (F1) cable, a feeder two (F2) cable, a feeder three (F3) cable, a feeder four (F4) cable, a distribution cable, a drop cable, and/or customer-premises wiring), terminals, and/or distributions points (e.g., an RT, an SAI, a serving terminal, a vault, a pedestal and/or any other type(s) of wiring distribution points). Such segments of twisted-pair telephone wire may be spliced and/or connected end-to-end, and/or may be connected at only one end thereby creating one or more bridged-taps. Regardless of the number, type(s), gauge(s) and/or topology of twisted-pair telephone wires used to construct the example loops 125-128, they will be referred to herein in the singular form, but it will be understood that the term "loop" may refer to one or more twisted-pair telephone wire segments and may include one or more bridged taps.

As commonly used in the industry, the term "network demarcation" denotes a location and/or device where cabling and/or equipment associated with a service provider (e.g., associated with the CO 105 and/or the DSLAMs/VRADs 115-117) is physically, electrically and/or communicatively coupled to cabling and/or equipment associated with a customer premises, a subscriber, a user and/or a customer (e.g., any of the example customer premises 110-112). Such subscriber cabling and/or equipment are often owned by the customer but may, in some instances, be owned, leased and/or otherwise provided by the service provider. Typically a network demarcation unit (e.g., a network interface device (NID) 130) is located at the network demarcation (e.g., on the outside of an exterior wall of the customer-premises 110) to implement the physical, electrical and/or communicative coupling between the subscriber and service provider sides of the network demarcation. For instance, the example NID 130 of FIG. 1 contains a first set or pair of screw terminals and/or jacks 135 to couple the loop 125 to the NID 130, and contains a second set or pair of screw terminals and/or jacks 140 to couple subscriber cabling 145 to the NID 130. The example subscriber cabling 145 electrically couples the CPE DSL modem 120 to the NID 130 and, thus, to the loop 125. Example NIDs 131 and 132 likewise contain pairs or sets of screw terminals and/or jacks as described for the NID 130. In a conventional and/or traditional NID, such as the example NID 132 of FIG. 1, a jumper and/or wire 137 electrically couples the two sets of cabling 127 and 146 across the NID 132.

To permit probing, interrogation, sensing and/or any other form(s) of testing of the example loops 125 and 126 from the example CO 105, the example NIDs 130 and 131 of FIG. 1 are enhanced NIDs (eNIDs). The example eNIDs 130 and 131 of FIG. 1 each include a switch 150 to allow the loops 125 and 126 to be looped back at the eNIDs 130 and 131, respectively. The example switches 150 of FIG. 1 may be used to configure a loop back for an individual loop 125, 126 and/or to configure a loop back using an additional loop. In general, the type of loop back realized by the example switches 150 at any particular eNID 130, 131 depends on how conductors of the loops 125, 126 and 128 and conductors of the subscriber wiring 145 and 147 are connected to respective terminals of the example switches 150. The example switch 150 of the example eNID 130 of FIG. 1 can be controlled, configured and/or positioned to: a) a first or loopback position to electrically couple a first conductor 125A of the example loop 125 to a second conductor 125B of the loop 125, or b) a second or normal operation position to electrically couple the first and second conductors 125A and 125B of the loop 125 to respective conductors 145A and 145B of the subscriber wiring 145. The example switch 150 of the example eNID 131 of FIG. 1 can be controlled, configured and/or positioned to: a) a first or loopback position to electrically couple one conductor 126A of the example loop 126 to one conductor 128A of another subscriber loop 128, or b) a second or normal operation position to electrically couple the of the loop 126 to one conductor 147A of subscriber wiring 147. In some examples, all NIDs 130-132 within a geographic area are eNIDs. Additionally or alternatively, a statistically representative set of NIDS 130-132 within a geographic area implement eNIDs. In such examples, test data collected using the associated representative set of loops 125-128 can be used to infer, project and/or otherwise construe the ability of the geographic area as a whole to support the communication service.

To allow the example switches 150 to be remotely configurable and/or controllable, each of the example eNIDs 130 and 131 of FIG. 1 includes a switch controller 152. The example switch controllers 152 of FIG. 1 receive one or more values, parameters and/or signals from any type of network management server (NMS) 155 via the example DSLAM 115 and a corresponding loop 125, 126. The received values, parameters and/or signals indicate to a particular switch controller 150 whether the eNID 130, 131 associated with that switch controller 150 is to be configured in a loop back state. In some examples, telemetry signals are used to provide loop back state information to the switch controllers 150 via the loops 125 and 126.

To test the ability of the loops 125-128 to support a communication service, the example DSLAMs/VRADs 115-117 of FIG. 1 implement any number and/or type(s) of line test modules, three of which are designated at reference numerals 160, 161 and 162. Using any number and/or type(s) of device(s), component(s), transmitter(s), receiver(s), method(s), algorithm(s), rule(s), procedure(s) and/or logic, the example line test modules 160-162 of FIG. 1 probe, interrogate, sense and/or otherwise test the example loops 125-128 by, for example, sending and/or receiving one or more test signals on a looped back subscriber line 125-128. Based on the transmitted and/or received test signal(s), the example test modules 160-162 determine one or more test results, values and/or parameters that represent and/or characterize the loops 125-128 and/or that represent and/or characterize the ability of the loops 125-128 to support a particular communication service. Example test results, values and/or parameters include, but are not limited to, a supportable communication service type, a supportable communication service data rate, a useable frequency band, whether bridged taps are present, loop lengths, wire gauge(s), attenuation versus frequency data, amount of noise and/or interference that is present, etc.

To test, pre-qualify and/or otherwise determine whether a communication service could be reliably, efficiently and/or cost effectively provided to a user community at a desired level of customer satisfaction, the example access network 100 of FIG. 1 includes a pre-qualification server 165. As used herein the term "user community" refers to any plurality of customer premises 110-112, persons, users and/or subscribers associated with a particular geographic area and/or associated with a particular communication distribution point. Example geographic areas include, but are not limited to, a neighborhood, a street, a telephone exchange, an area code, a portion of a city, a city, a zip code, a postal code, a county, a region, a country, and/or any combination thereof. Example communication distribution points include, but are not limited to, a DSLAM/VRAD, a cable head end, a CO, an RT, a SAI, an intermediate office, a serving office, and/or any combination thereof.

The example pre-qualification server 165 of FIG. 1 assesses the ability of the example access network 100 to provide one or more communication services to a user community. For example, the example pre-qualification server 165 can be used to assess, estimate and/or otherwise analyze whether it is feasible, reasonable and/or appropriate to begin marketing, selling, promoting and/or deploying VDSL services to a user community associated with the example CO 105. In particular, the example pre-qualification server 165 assesses the ability of the example loops 125-128 to support the VDSL services. The example pre-qualification server 165 of FIG. 1 assesses the loops 125-128 by: a) remotely controlling the eNIDs 130 and 131 into a loop-back state via the example NMS 155, and b) controlling the test modules 160 to test the loops 125 and 126. The loops 125 and 126 may be tested sequentially and/or in parallel. The time(s) of day(s) at and/or during which testing is performed may be selected a priori to minimize the interruptions of existing services and/or selected by sensing when an existing service is inactive and only performing testing during such inactive periods. Based on the test results determined by the example test modules 160, the example pre-qualification server 165 of FIG. 1 generates a pre-qualification report that represents, characterizes and/or reflects how practical it is to deploy a particular communication service to the user community, and/or a degree to which a particular communication service may be provided to and/or operated for the user community. The example pre-qualification server 165 compiles the test results from multiple loops 125-128 to generate the pre-qualification report. In the illustrated example of FIG. 1, the generated pre-qualification report is provided to a sales and/or marketing server and/or organization 170. An example pre-qualification test report is described below in connection with FIG. 2.

An example metric that may be used to represent the ability of a user community to support a particular service (for example, a 50 Mbps VDSL service) and/or represent a degree to which the service may be provided to and/or operator for the user community is the number and/or percentage of the loops 125-128 that do not appear to be currently able to support the service. That is, the number, count and/or percentage of loops 125-128 that have exceptions, which may currently preclude deployment of the communication service. For example, if less than 10 percent (%) of the loops 125-128 would require maintenance and/or repair (for example, to remove bridge taps and/or to reduce interference noise), marketing and/or sales organizations can widely market, sell and/or promote the service to the user community. If between 10% and 30% of the loops 125-128 may require maintenance and/or repair, the service can be marketed, sold and/or promoted on a limited basis depending on the availability of adequate numbers of service technicians to diagnose and/or troubleshoot service problems that arise during installations and/or in response to customer calls. When more than 30% of the loops 125-128 may require maintenance and/or repair, it may be more cost effective to delay marketing, selling and/or promoting the service until adequate remediation of the loop plant is performed. If such loop plant remediation is not performed up front, customer satisfaction and/or revenues may be negatively impacted. An example process that may be carried out to pre-qualify a user community for a community service is described below in connection with FIG. 5.

The device(s), component(s), transmitter(s), receiver(s), method(s), algorithm(s), rule(s), procedure(s) and/or logic implemented by the example test modules 160-162 of FIG. 1 to test, characterize and/or pre-qualify the loops 125-128 for a communication service can be progressively improved as the communication service is installed for different user communities. For example, pre-qualification test results determined for a first user community can be compared with actual installation experiences for the first user community to identify enhancements, refinements and/or improvements to the pre-qualification process(es) implemented by the example pre-qualification server 165 and the test modules 160-162 to pre-qualify one or more loops associated with a second user community for the communication service. For example, if it was empirically observed that more loops of the first user community were unable to support the communication service than the number estimated by the example pre-qualification server 165, one or more threshold(s), method(s), algorithm(s), rule(s), procedure(s) and/or logic used by the example test modules 160-162 can be modified and/or adjusted accordingly.

In addition to or alternative to the automated testing and/or pre-qualification of a user community for a communication service described above, the example pre-qualification server 165 of FIG. 1 can interact with and/or utilize a user, customer and/or subscriber 175 to assess whether it is feasible to install and/or deploy a particular communication service for that user 175. While such testing is performed responsive to individual users 175, the results of such testing can be combined with a) testing performed for and/or by other individual users 175 and/or b) automated testing results to pre-qualify a user community at large for the service.

The example user 175 of FIG. 1 may learn about and/or be notified of new and/or upgraded communication service(s) via any number and/or type(s) of means. For example, the user 175 may be receive a flyer via postal mail, may receive an email, and/or be presented with a webpage. Such notifications can present information (e.g., cost, features, etc.) regarding the new and/or upgraded communication service(s), provide information regarding how the user 175 can learn more about the new and/or upgraded communication service(s), and/or provide information regarding how to test or assess whether they are able to receive the new and/or upgraded communication service(s) at their respective customer premises 112. In response to any such notification(s), the example user 175 of FIG. 1 downloads and installs evaluation software 180 on any type of personal computer (PC) 185 that is communicatively coupled to their respective CPE DSL modem 122. The example evaluation software 180 of FIG. 1 may be downloaded from, for example, the pre-qualification server 165 via the VRAD 116, the loop 127 and the CPE DSL modem 122. In some examples, the example evaluation software 180 is implemented with a web-based graphical user interface (GUI), and implements one or more web-based application programming interfaces (APIs) to interact with the CPE DSL modem 122 and/or the example pre-qualification server 165.

When execution of the evaluation software 180 is activated and/or started on the example PC 185, the example evaluation software 180 of FIG. 1 collects from the pre-qualification server 165 information (e.g., cost, features, etc.) regarding the new and/or upgraded communication service(s) and presents the collected information to the user 175 via, for example, a web-based GUI. The presented web-based GUI includes one or more user interface elements, such as buttons, check boxes, menus, etc., which allow the user 175 to indicate and/or provide permission for the CPE DSL modem 122 and the example pre-qualification server 165 to: a) temporarily interrupt one or more existing services present on the loop 127 and to test the loop 127, and b) determine whether the loop 127 is capable to support the new and/or upgraded communication service(s).

After receiving permission from the user 175, the example evaluation software 180 of FIG. 1 activates a test module implemented by the example CPE DSL modem 190. Using any number and/or type(s) of device(s), component(s), transmitter(s), receiver(s), method(s), algorithm(s), rule(s), procedure(s) and/or logic, the example test module 190 of FIG. 1 probes, interrogates, senses and/or otherwise tests the example loop 127 by, for example, exchanging one or more test signals with the example test module 161 via the loop 127. Based on the exchanged test signal(s), the example test module 161 and/or the example test module 190 determine one or more test results, values and/or parameters that represent and/or characterize the loop 127 and/or that represent and/or characterize the ability of the loop 127 to support one or more communication services. Example test results, values and/or parameters include, but are not limited to, an estimated data rate, a useable frequency band, whether bridged taps are present, loop lengths, wire gauge(s), attenuation versus frequency data, amount of noise and/or interference that is present, etc.

When testing of the loop 127 is completed, the example evaluation software 180 of FIG. 1 restores the previous configuration of the example CPE DSL modem 122 to restore any existing communication service(s) that were interrupted by the testing of the loop 127. The example evaluation software 180 presents one or more results of the testing to the user 175 via, for example, a web-based GUI. Example presented results include, but are not limited to, an indication of whether the new and/or upgraded communication service(s) can be supported by the loop 127 and, if supported, how the user 175 can request and/or make further inquiry about the new and/or upgraded communication service(s). In some examples, the presented results include a uniform resource link (URL) that allows the user to proceed to a customer service and/or order entry website, which allows the user 175 to request activation and/or installation of the new and/or upgraded communication service(s). The presented web-based GUI also includes one or more user interface elements, such as buttons, check boxes, menus, etc., which prompt the user 175 to indicate and/or provide how interested they are in subscribing to the new and/or upgraded communication service(s). Service interest information collected by the evaluation software 180 from the user 175 is provided to the pre-qualification server 165 via, for example, the CPE DSL modem 122, the loop 127 and the VRAD 116.

Based on the testing performed on the loop 127 and/or the collected interest information, the example pre-qualification server 165 of FIG. 1 generates a customer premises evaluation report that includes one or more results of the testing and/or the interest level provided by the user 175. An example user evaluation report is described below in connection with FIG. 3. Based on the example test, the example pre-qualification server 165 also updates a market analysis report and/or a pre-qualification test report. An example market analysis report is described below in connection with FIG. 4.

While an example access network 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example line test modules 160-162, the example pre-qualification server 165, the example evaluation software 180, and/or the example test module 190 of FIG. 1 may be implemented by hardware, software, firmware and/or any combination of hardware, software and/or firmware. Thus, for example, any of the example line test modules 160-162, the example pre-qualification server 165, the example evaluation software 180, and/or the example test module 190 may be implemented by one or more device(s), circuit(s), programmable processor(s), application specific integrated circuit(s) (ASIC(s)), programmable logic device(s) (PLD(s)) and/or field programmable logic device(s) (FPLD(s)), etc. Further still, an access network may include interfaces, data structures, elements, processes and/or devices instead of, or in addition to, those illustrated in FIG. 1 and/or may include more than one of any or all of the illustrated interfaces, data structures, elements, processes and/or devices.

While an example manner of implementing the example eNIDs 130 and 131 are illustrated in FIG. 1, one or more of the elements, processes, interfaces and/or devices illustrated in connection with the example eNIDs 130 and/or 131 FIG. 1 may be combined, divided, re-arranged, omitted, eliminated and/or implemented in any way. Further, the example switches 150, the example switch controllers 152 and/or, more generally, the example eNIDs 130 and 131 of FIG. 1 may be implemented by hardware, software, firmware and/or any combination of hardware, software and/or firmware. Thus, for example, any or all of the example switches 150, the example switch controllers 152 and/or, more generally, the example eNIDs 130 and 131 may be implemented by one or more circuit(s), programmable processor(s), ASIC(s), PLD (s) and/or FPLD(s), etc. Further still, an eNID may include one or more elements, processes, interfaces and/or devices in addition to, or instead of, those illustrated in FIG. 1, and/or may include more than one of any or all of the illustrated elements, processes, interfaces and devices.

Figure 2:
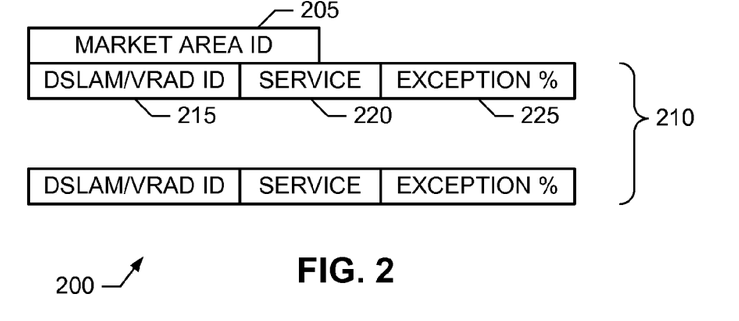
FIG. 2 illustrates an example pre-qualification test report that may be generated by the example pre-qualification server of the FIG. 1.

FIG. 2 illustrates an example pre-qualification test report 200. To identify a marketing area, the example pre-qualification test report 200 of FIG. 2 includes a marketing area identifier field 205. The example marketing area identifier field 205 of FIG. 2 contains one or more values, letters and/or strings that uniquely identify a particular marketing area, such as a neighborhood, a street, a telephone exchange, an area code, a portion of a city, a city, a zip code, a postal code, a county, a region, a country, and/or any combination thereof.

The example pre-qualification test report 200 of FIG. 2 includes a plurality of entries 210 for respective combinations of communication services and DSLAMs/VRADs 115-117 that are located within the marketing area identified by the field 205, and which were analyzed by the example pre-qualification server 165. To identify a DSLAM/VRAD 115-117, each of the example entries 210 of FIG. 2 includes a DSLAM/VRAD identifier field 215. Each of the example DSLAM/VRAD identifier fields 215 of FIG. 2 contains one or more values, letters and/or strings that uniquely identify a particular DSLAM/VRAD 115-117.

To identify a particular type and/or speed of communication service (e.g., 25 Million bits per second (Mbps) VDSL service), each of the example entries 210 of FIG. 2 includes a service field 220. Each of the example service fields 220 of FIG. 2 contains one or more values, letters and/or strings that uniquely identify a particular service that was analyzed. To store the number and/or percentage of loops 125-128 that may not currently be able to support the service 220, each of the example entries 210 of FIG. 2 includes an exception field 225. The example exception field 225 of FIG. 2 contains a number that represents the percentage of loops 125-128 associated with the DSLAM/VRAD 115-117 identified in the field 215 that may require maintenance and/or repair before the corresponding service 220 can be reliably deployed. An example value stored in the exception field 225 represents a ratio of an exception count and a number of tested loops.

While an example pre-qualification test report 200 that may be generated by the example pre-qualification server 165 of FIG. 1 is illustrated in FIG. 2, the example pre-qualification test report 200 may be implemented using any number and/or type(s) of other and/or additional entries, fields and/or data. Further, the entries, fields and/or data illustrated in FIG. 2 may be combined, divided, re-arranged, eliminated and/or implemented in any way. Further still, the pre-qualification test report 200 may include entries, fields and/or data in addition to, or instead of, those illustrated in FIG. 2, and/or may include more than one of any or all of the illustrated entries, fields and/or data.

Figure 3:
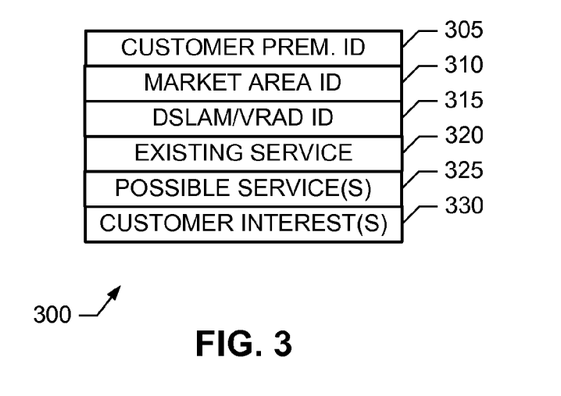
FIG. 3 illustrates an example customer premises evaluation report that may be generated by the example pre-qualification server of FIG. 1.

FIG. 3 illustrates an example customer premises evaluation report 300 that may be generated by the example pre-qualification server 165 of FIG. 1. To identify a particular customer premises, the example customer premises evaluation report 300 contains a customer identifier field 305. The example customer identifier field 305 of FIG. 3 contains one or more values, letters and/or strings that uniquely identify a particular subscriber and/or customer premises.

To identify a marketing area associated with the customer premises 305, the example customer premises evaluation report 300 of FIG. 3 includes a marketing area identifier field 310. The example marketing area identifier field 310 of FIG. 3 contains one or more values, letters and/or strings that uniquely identify a particular marketing area, such as a neighborhood, a street, a telephone exchange, an area code, a portion of a city, a city, a zip code, a postal code, a county, a region, a country, and/or any combination thereof.

To identify a DSLAM/VRAD 115-117 associated with the customer premises 305, the example customer premises evaluation report 300 of FIG. 3 includes a DSLAM/VRAD identifier field 315. The example DSLAM/VRAD identifier field 315 of FIG. 3 contains one or more values, letters and/or strings that uniquely identify a particular DSLAM/VRAD 115-117. To identify an existing communication service associated with the customer premises 305, the example customer premises evaluation report 300 of FIG. 3 includes an existing service field 320. The example existing service field 320 of FIG. 3 contains one or more values, letters and/or strings that uniquely identify a particular service currently being provided to the customer premises 305.

To identify possible communication service(s), the example customer premises evaluation report 300 of FIG. 3 includes a possible service field 325. The example possible service field 325 of FIG. 3 contains one or more values, letters and/or strings that uniquely identify one or more communication services that have been identified as being deployable to the customer premises 305. To store interest information, the example customer premises evaluation report 300 of FIG. 3 includes an interest field 330. The example interest field 330 of FIG. 3 contains one or more numbers that respectively represent how interested a user associated with the customer premises 305 is in subscribing to each of the services 325.

While an example customer premises evaluation report 300 that may be generated by the example pre-qualification server 165 of FIG. 1 is illustrated in FIG. 3, the example customer premises evaluation report 300 may be implemented using any number and/or type(s) of other and/or additional entries, fields and/or data. Further, the entries, fields and/or data illustrated in FIG. 3 may be combined, divided, re-arranged, eliminated and/or implemented in any way. Further still, the customer premises evaluation report 300 may include entries, fields and/or data in addition to, or instead of, those illustrated in FIG. 3, and/or may include more than one of any or all of the illustrated entries, fields and/or data.

Figure 4:
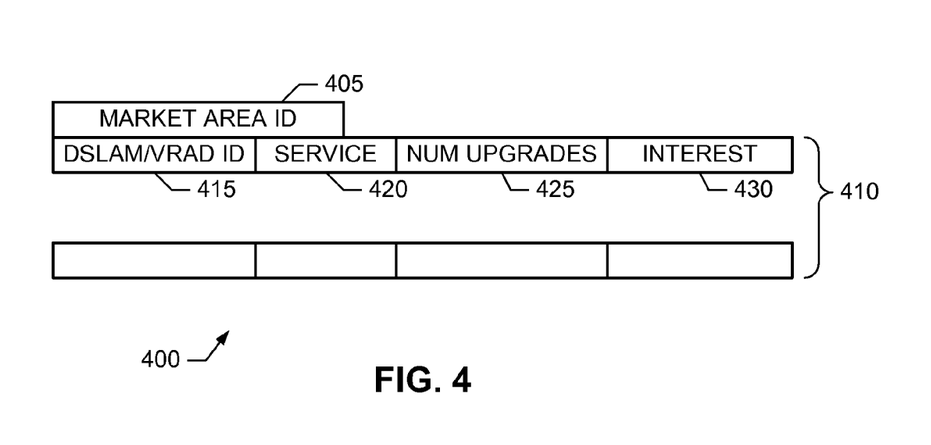
FIG. 4 illustrates an example market analysis report that may be generated by the example pre-qualification server of FIG. 1.

FIG. 4 illustrates an example market analysis report 400. To identify a marketing area, the example pre-qualification test report 400 of FIG. 4 includes a marketing area identifier field 405. The example marketing area identifier field 405 of FIG. 4 contains one or more values, letters and/or strings that uniquely identify a particular marketing area, such as a neighborhood, a street, a telephone exchange, an area code, a portion of a city, a city, a zip code, a postal code, a county, a region, a country, and/or any combination thereof.

The example market analysis report 400 of FIG. 4 includes a plurality of entries 410 for respective combinations of communication services and DSLAMs/VRADs 115-117 that are located within the marketing area identified by the field 405, and which were analyzed by the example pre-qualification server 165. To identify a DSLAM/VRAD 115-117, each of the example entries 410 of FIG. 4 includes a DSLAM/VRAD identifier field 415. Each of the example DSLAM/VRAD identifier fields 415 of FIG. 4 contains one or more values, letters and/or strings that uniquely identify a particular DSLAM/VRAD 115-117.

To identify a particular type and/or speed of communication service (e.g., 25 Million bits per second (Mbps) VDSL service), each of the example entries 410 of FIG. 4 includes a service field 420. Each of the example service fields 420 of FIG. 4 contains one or more values, letters and/or strings that uniquely identify a particular service that was analyzed. To store the number loops 125-128 that are able to support the service 420, each of the example entries 410 of FIG. 4 includes a number of upgrades field 425. The example number of upgrades field 425 of FIG. 4 contains a number that represents the number of loops that have been tested as capable of supporting the service 420. To store interest information, each of the example entries 410 of FIG. 4 includes an interest field 430. Each of the example interest fields 430 of FIG. 4 contains a number that collectively represents how interested a user community associated with the example DSLAM/VRAD 415 is in subscribing to the service 420.

While an example market analysis report 400 that may be generated by the example pre-qualification server 165 of FIG. 1 is illustrated in FIG. 4, the example market analysis report 400 may be implemented using any number and/or type(s) of other and/or additional entries, fields and/or data. For example, the example pre-qualification test report 200 may be combined with the example marketing analysis report 400 to form a report that collectively represents a number of upgradeable loops, a percentage of exceptions and subscriber interest information for each combination of DSLAM/VRAD and communication service. Further, the entries, fields and/or data illustrated in FIG. 4 may be combined, divided, re-arranged, eliminated and/or implemented in any way. Further still, the market analysis report 400 may include entries, fields and/or data in addition to, or instead of, those illustrated in FIG. 4, and/or may include more than one of any or all of the illustrated entries, fields and/or data.

Figure 5:
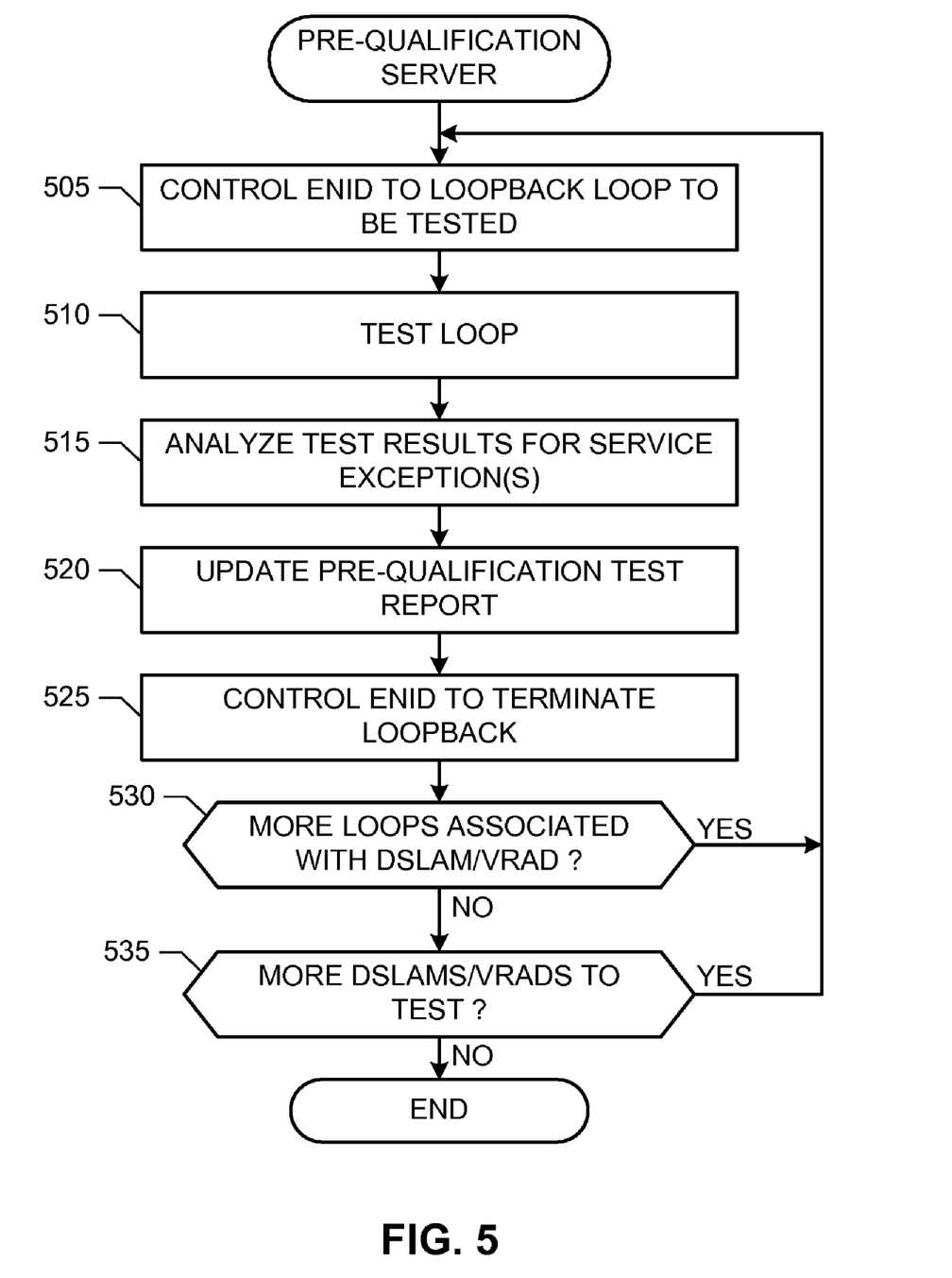
FIGS. 5 and 6 are flowcharts representative of example processes that may be carried out to implement the example pre-qualification server of FIG. 1.
Figure 6:
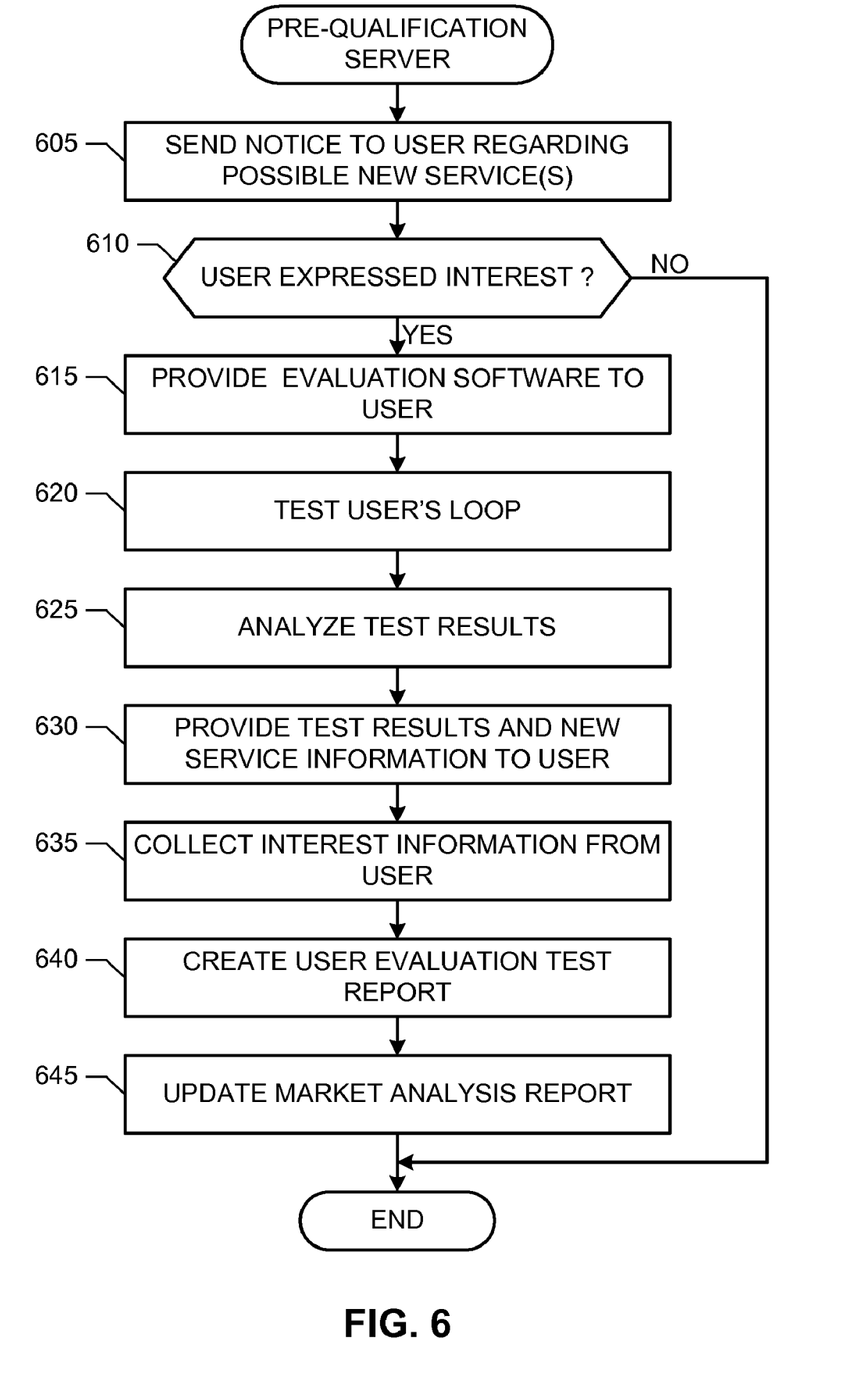
Figure 7:
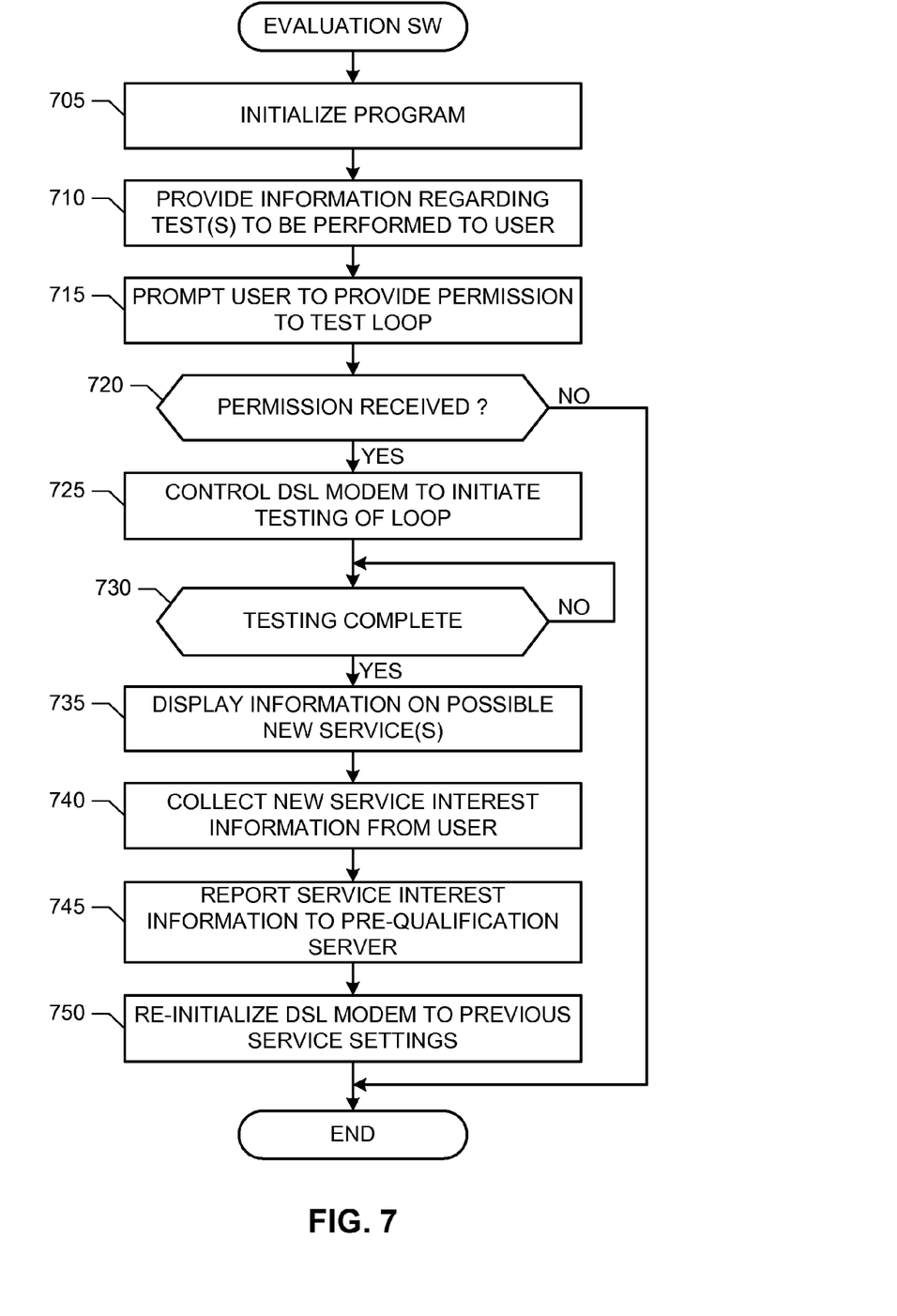
FIG. 7 is flowchart representative of an example process that may be carried out to implement the example evaluation software of FIG. 1.
Figure 8:
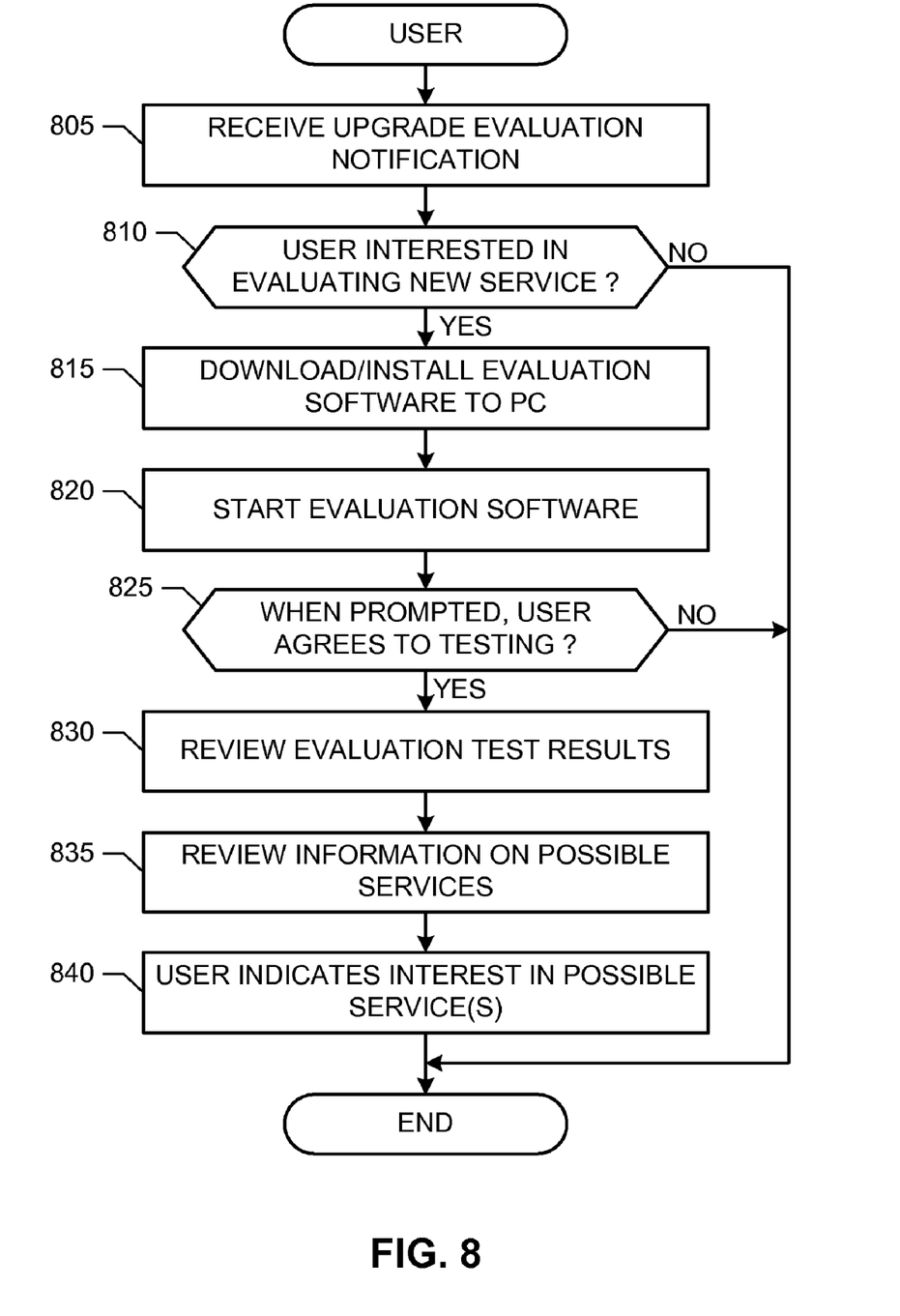
FIG. 8 is flowchart representative of an example process that may be carried out by a user to test their subscriber loop for an emerging service.

FIGS. 5 and 6 are flowcharts representative of example processes that may be carried out to implement the example pre-qualification server 165 of FIG. 1. FIG. 7 is a flowchart representative of an example process that may be carried out to implement the example evaluation software 180 of FIG. 1. FIG. 8 is a flowchart representative of an example process that may be carried out by, for example, the user 175, to test a loop 125-128 for a communication service.

The example processes of FIGS. 5-7 may be carried out by a processor, a controller and/or any other suitable processing device. For example, the example processes of FIGS. 5-7 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 9). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 5-7 may be implemented using any combination(s) of ASIC(s), PLD(s), FPLD(s), discrete logic, hardware, firmware, etc. Also, some or all of the example processes of FIGS. 5-7 may instead be implemented manually or as any combination of any of the foregoing techniques, for example, any combination of firmware, software, discrete logic and/or hardware. Further, many other methods of implementing the example operations of FIGS. 5-8 may be employed. For example, the order of execution of the blocks may be changed, and/or one or more of the blocks described may be changed, eliminated, sub-divided, or combined. Additionally, any or all of the example processes of FIGS. 5-8 may be carried out sequentially and/or carried out in parallel by, for example, separate processing threads, processors, devices, discrete logic, circuits, etc.

The example process of FIG. 5 begins with the example pre-qualification server 165 of FIG. 1 remotely controlling an eNID associated with a presently considered loop (e.g., the example eNID 130 associated with the loop 125) into a loop back state via the NMS 155 (block 505). The pre-qualification server 165 directs a line test module 160-162 associated with the presently considered loop to interrogate and/or test the loop (block 51 0). When testing is complete, the line test module 160-162 and/or the pre-qualification server 165 determine whether the presently considered loop is an exception relative to a communication service being tested (block 515). That is, the line test module 160-162 and/or the pre-qualification server 165 determine whether the loop is able to support the communication service.

Based on the test results, the pre-qualification server 165 updates a pre-qualification test report, such as the example pre-qualification test report 200 of FIG. 2 (block 520). For example, for each loop tested, the pre-qualification server 165 increments an exception count when the loop is unable to support the communication service being tested. The pre-qualification server 165 controls the eNID out of the loop back state via the NMS 155 (block 525).

If there are more loops associated with a presently considered DSLAM/VRAD 115-117 to test (block 530), control returns to block 505 to test the next loop. If there are no more loops associated with the presently considered DSLAM/VRAD 115-117 to test (block 530), the pre-qualification server 165 determines whether there are more DSLAMs/VRADs 115-117 to test (block 535). If there are more DSLAMs/VRADs 115-117 to test (block 535), control returns to block 505 to start testing the next DSLAM/VRAD 115-117. If there are no more DSLAMs/VRADs 115-117 to test (block 535), control exits from the example process of FIG. 5.

The example process of FIG. 6 begins with the example pre-qualification server 165 and/or the example marketing/sales marketing server and/or organization 170 of FIG. 1 providing a notice regarding new and/or upgraded communication service(s) to a user 175 associated with a particular customer premises 110-112 (block 605). If the user 175 responds to the notification with an interest in and/or permission to test their associated loop 125-128 for the new and/or upgraded communication service(s) (block 610), the pre-qualification server 165 provides the example evaluation software 180 of FIG. 1 to the user 175 (block 615). Responsive to initiation of the evaluation software 180 by the user 175, the example pre-qualification server 165, the example line test module 160-162 and the example test module 190 of FIG. 1 test the user's loop 125-128 for the communication service(s) (block 620). When testing is complete, the line test module 160-162, the test module 190 and/or the pre-qualification server 165 determine whether the presently considered loop 125-128 is able to support the new and/or upgraded communication service(s) being tested (block 625).

The pre-qualification server 165 provides results of the testing and/or information regarding supportable new and/or upgraded communication service(s) to the user 175 via the evaluation software 180 (block 630). The pre-qualification server 165 collects information regarding the user's interest in the new and/or upgraded communication service(s) via the evaluation software 180 (block 635). The pre-qualification server 165 creates a customer premises evaluation report, such as the example customer premises evaluation report 300 of FIG. 3 (block 640), and updates a market analysis report, such as the example market analysis report 400 of FIG. 4 (block 645). Control then exits from the example process of FIG. 6.

Returning to block 610, if the user did not express an interest in and/or provide permission to test their associated loop 125-128 (block 610), control exits from the example process of FIG. 6.

The example process of FIG. 7 begins with the example evaluation software 180 initializing one or more of its internal variables, parameters and/or states (block 705). The evaluation software 180 provides information regarding the test(s) to be performed via, for example, a web-based GUI (block 710), and prompts the example user 175 for permission to begin the test(s) (block 715). If permission is received (block 720), the evaluation software 180 controls the example test module 190 of the example CPE DSL modem 122 associated with the evaluation software 180 to begin testing of the loop 125-128 (block 725).

When testing is complete (block 730), the evaluation software 180 collects and displays test results and/or information regarding supportable new and/or upgraded communication service(s) for the user 175 (block 735). The evaluation software 180 collects from the user 175 information regarding their interest in the new and/or upgraded communication service(s) (block 740), and reports the collected interest information to the example pre-qualification server 165 (block 745). The evaluation software 180 controls the CPE DSL modem 122 to return to its previous setting(s) and/or configuration to restore any interrupted service(s) (block 750). Control then exits from the example process of FIG. 7.

Returning to block 720, if the user does not provide permission to test the loop 125-128 (block 720), control exits from the example process of FIG. 7 without testing the user's loop 125-128.

The example process of FIG. 8 begins with the example user 175 of FIG. 1 receiving a notification regarding new and/or upgraded communication service(s) (block 805). If the user 175 is interested in testing their associated loop 125-128 for the new and/or upgraded communication service(s) (block 810), the user 175 downloads and/or installs the evaluation software 180 on the PC 185 communicatively coupled to their CPE DSL modem 120-122 (block 815). The user 175 starts execution of the evaluation software 180 (block 820).

If the user 175 provides permission to test their associated loop 125-128 (block 825), the user 175 reviews one or more test results when testing is complete (block 830). The user 175 also reviews information regarding the new and/or upgraded communication service(s) (block 835). When prompted, the user 175 provides one or more indications of interest in the new and/or upgraded communication service(s) (block 840). The example process of FIG. 8 is then ended.

Returning to block 825, if the user 175 does not provide permission to test their associated loop 125-128 (block 825), the example process of FIG. 8 is ended without testing the loop 125-128.

Figure 9:
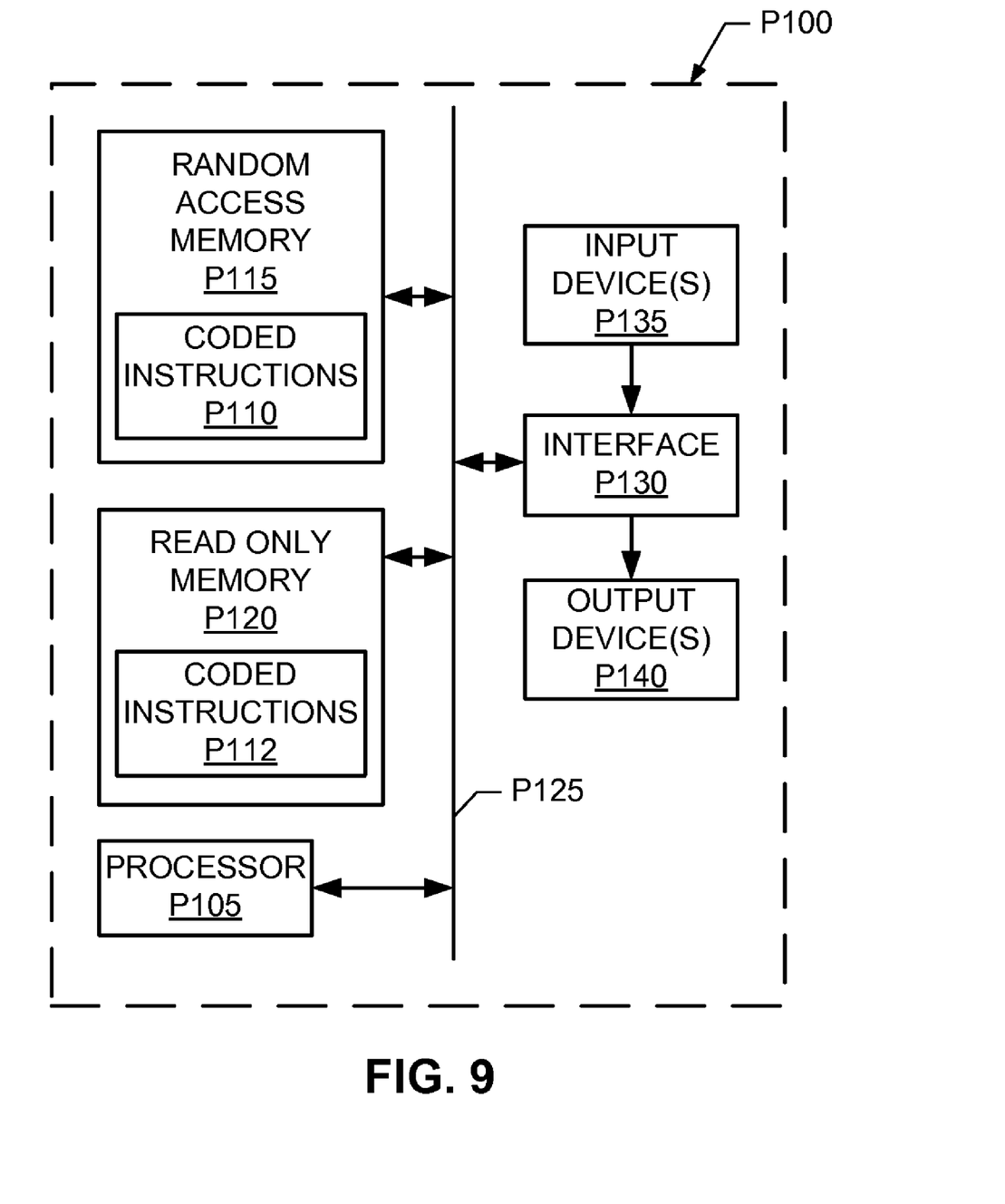
FIG. 9 is a schematic illustration of an example processor platform that may be used and/or programmed to carry out the example process of FIGS. 5-7, and/or to implement any or all of the methods and apparatus disclosed herein.

FIG. 9 is a schematic diagram of an example processor platform P100 that may be used and/or programmed to implement the example DSLAMs/VRADs 115-117, the example CPE DSL modems 120-122, the example eNIDs 130 and 131, the example switch controllers 152, the example NMS 155, the example pre-qualification server 165, the example test modules 160-162 and 190, the example evaluation software 180 and/or the example personal computer 185. For example, the processor platform P100 can be implemented by one or more general-purpose processors, processor cores, microcontrollers, etc.

The processor platform P100 of the example of FIG. 9 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 5-7 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P 120 may be controlled by a memory controller (not shown). One or both of the example memories P115 and P120 may be used to store the example pre-qualification test report 200, the example customer premises evaluation report 300 and/or the example market analysis report 400.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, transmit and/or receive test signals, to receive switch 150 control information and/or to control the switches 150.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
sensing service activity status for a first loop and a second loop;
configuring a first remote network demarcation associated with a first customer premises and with the first loop to a loop-back state when an inactive status associated with the service on the first loop is sensed;
interrogating the first loop to determine a first parameter representative of the first loop when the inactive status is sensed, and preventing interrogation of the first loop when the service activity status indicates activity;
configuring a second remote network demarcation associated with a second customer premises and with the second loop to the loop-back state when an inactive status associated with the service on the second loop is sensed;

interrogating the second loop to determine a second parameter representative of the second loop, and preventing interrogation of the second loop when the service activity status indicates activity; and compiling a report based on the first and second parameters, the report containing a value representing an indication of a communication service ability to be provided to a user community.

2. A method as defined in claim 1, wherein interrogating the first loop comprises at least one of transmitting a first signal on the first loop, or receiving a second signal on the first loop.

3. A method as defined in claim 1, wherein determining the first parameter comprises determining whether the first loop meets a criterion associated with the communication service, and wherein compiling the report comprises incrementing an exception count when the first loop fails to meet the criterion.

4. A method as defined in claim 1, wherein the report comprises a value representing a percentage of loops of the user community that may fail to meet a criterion associated with the communication service.

5. A method as defined in claim 4, wherein the percentage is estimated based on interrogations performed on a representative set of loops associated with the user community.

6. A method as defined in claim 1, further comprising:
comparing the compiled report to results of an installation of the communication service to a customer premises associated with a user community; and
refining, based on the comparison, at least one of a method, algorithm, process, or parameter used to interrogate a third loop and determine a third parameter representative of the third loop.

7. A method as defined in claim 6, wherein the third loop is associated with a second user community that is different from the first user community.

8. A method as defined in claim 1, wherein configuring the first network demarcation to the loop-back state comprises remotely configuring a switch at the first network demarcation to electrically couple a first conductor of the first loop to a second conductor of the first loop.

9. A method as defined in claim 1, wherein configuring the first network demarcation to the loop-back state comprises remotely configuring a switch at the first network demarcation to electrically couple a first conductor of the first loop to a second conductor of a third loop, and interrogating the first loop comprises transmitting a first signal on the first loop and receiving a second signal on the third loop.

10. A method as defined in claim 1, wherein the first parameter represents at least one of a supportable communication service type, a supportable communication service data rate, a useable frequency band, whether a bridged tap is present, a loop length, a wire gauge, attenuation versus frequency data, an amount of noise that is present, or an amount of interference that is present.

11. A method as defined in claim 1, wherein the first parameter represents a condition of the first loop that prevents the first loop from supporting the communication service.

12. A method as defined in claim 1, further comprising a communication distribution point of a user community comprising at least one of a digital subscriber line access multiplexer, a video-ready access device, a remote terminal, a serving area interface, a central office, a serving office, an intermediate office, or a cable modem head end.

13. A method as defined in claim 1, further comprising a geographic area of a user community comprising at least one of a street, a neighborhood, a portion of a city, a city, a county, a state, a country, a zip code, a postal code, a telephone exchange, or an area code.

14. A method as defined in claim 1, further comprising:
identifying a percentage of a plurality of loops within the user community that require repair;
authorizing marketing of the communication service to the user community when the percentage is less than a first threshold;
authorizing marketing of the communication service to a portion of the user community when the percentage is less than a second threshold and greater than the first threshold; and
delaying marketing activities for the communication service when the percentage is greater than the second threshold.

15. A method as defined in claim 1, wherein the user community comprises a plurality of customer premises, persons, users or subscribers associated with at least one of a same geographic area or a same communication distribution point.

16. A system comprising:
a first test module to (1) sense a service activity status for a first subscriber line, (2) to interrogate the first subscriber line when an inactive status of the first subscriber line is sensed to determine a first parameter representative of the first subscriber line, and (3) to prevent interrogation of the first subscriber line when the service activity status indicates activity, the first subscriber line associated with a first customer premises having a first demarcation point;
a second test module to (1) sense a service activity status for a second subscriber line, (2) to interrogate the second subscriber line when an inactive status of the second subscriber line is sensed to determine a second parameter representative of the second subscriber line, and (3) to prevent interrogation of the second subscriber line when the service activity status indicates activity, the second subscriber line associated with a second customer premises having a second demarcation point; and
a pre-qualification server to:
configure the first network demarcation point associated with the first subscriber line to a loop-back state in response to sensing the inactive status associated with the service on the first subscriber line;
configure the second network demarcation point associated with the second subscriber line to the loop-back state in response to sensing the inactive status associated with the service on the second subscriber line; and
generate a report based on the first and second parameters, the report containing a value that represents an indication of a communication service ability to be provided to a user community.

17. A system as defined in claim 16, wherein the first network demarcation point comprises:
a switch having first and second positions, wherein when the switch is in the first position the switch is to communicatively couple a first conductor of the first subscriber line to a second conductor of the first subscriber line; and
a switch controller responsive to the pre-qualification server to control the position of the switch.

18. A system as defined in claim 16, wherein the first network demarcation point comprises:
a switch having first and second positions, wherein when the switch is in the first position the switch is to couple a first conductor of the first subscriber line to a second conductor of a third subscriber line; and a switch controller responsive to the pre-qualification server to control the position of the switch.

19. A system as defined in claim 16, wherein the first parameter represents a condition of the first subscriber line that prevents the first subscriber line from supporting the communication service.

20. A system as defined in claim 16, wherein the communication distribution point comprises at least one of a digital subscriber line access multiplexer, a video-ready access device, a remote terminal, a serving area interface, a central office, a serving office, an intermediate office, or a cable modem head end.

21. A system as defined in claim 16, further comprising a user community having a geographic area comprising at least one of a street, a neighborhood, a portion of a city, a city, a county, a state, a country, a zip code, a postal code, a telephone exchange, or an area code.

22. A system as defined in claim 16, wherein the user community comprises any plurality of customer premises, persons, users or subscribers associated with at least one of a same geographic area or a same communication distribution point, the user community associated with the first and second subscriber lines.

23. A non-transitory machine readable storage medium comprising instructions that, when executed, cause a machine to perform operations comprising:

sensing service activity status for a first loop and a second loop;

configuring a first remote network demarcation associated with a first customer premises and with the first loop to a loop-back state when an inactive status associated with the service on the first loop is sensed;

interrogating the first loop to determine a first parameter representative of the first loop when the inactive status is sensed, and preventing interrogation of the first loop when the service activity status indicates activity;

configuring a second remote network demarcation associated with a second customer premises and with the second loop to the loop-back state when an inactive status associated with the service on the second loop is sensed;

interrogating the second loop to determine a second parameter representative of the second loop, and preventing interrogation of the second loop when the service activity status indicates activity; and compiling a report based on the first and second parameters, the report containing a value that represents an indication of a communication service ability to be provided to a user community.

24. A non-transitory machine readable storage medium as defined in claim 23, wherein the-instructions, when executed, cause the machine to determine the first parameter by at least determining whether the first loop meets a criterion associated with the communication service, and wherein compiling the report comprises incrementing an exception count when the first loop fails to meet the criterion.

25. A non-transitory machine readable storage medium as defined in claim 23, wherein the report comprises a value representing a percentage of loops of the user community that may fail to meet a criterion associated with the communication service.

26. A non-transitory machine readable storage medium as defined in claim 25, wherein the percentage is estimated based on interrogations performed on a representative set of loops associated with the user community.

27. A non-transitory machine readable storage medium as defined in claim 23, wherein instructions, when executed, cause the machine to:

identify a percentage of a plurality of loops within the user community that require repair;

authorize marketing of the communication service to the user community when the percentage is less than a first threshold;

authorize marketing of the communication service to a portion of the user community when the percentage is less than a second threshold and greater than the first threshold; and delay marketing activities for the communication service when the percentage is greater than the second threshold.

28. A non-transitory machine readable storage medium as defined in claim 23, wherein the user community comprises a plurality of customer premises, persons, users or subscribers associated with at least one of a same geographic area or a same communication distribution point.

\* \* \* \* \*